(12) United States Patent
Hwang et al.

(10) Patent No.: US 8,938,341 B2
(45) Date of Patent: Jan. 20, 2015

(54) METHOD FOR CONTROLLING CLUTCH OF AUTOMATIC TRANSMISSION FOR IMPROVEMENT OF FUEL EFFICIENCY

(75) Inventors: Jae Woong Hwang, Yongin-si (KR); Yong Wook Jin, Suwon-si (KR); Wan Soo Oh, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 397 days.

(21) Appl. No.: 13/410,029

(22) Filed: Mar. 1, 2012

(65) Prior Publication Data

US 2013/0118855 A1    May 16, 2013

(30) Foreign Application Priority Data

Nov. 16, 2011    (KR) .................. 10-2011-0119432

(51) Int. Cl.
*F16D 48/12*        (2006.01)
*B60W 10/06*      (2006.01)
(Continued)

(52) U.S. Cl.
CPC ............ *B60W 10/06* (2013.01); *B60W 10/115* (2013.01); *B60W 30/18072* (2013.01); *B60Y 2300/432* (2013.01); *B60W 2030/18081* (2013.01); *B60W 2510/0638* (2013.01); *B60W 2510/1015* (2013.01); *B60W 2530/16* (2013.01); *B60W 2540/10* (2013.01); *B60W 2540/12* (2013.01); *B60W 2550/142* (2013.01); *B60W 2710/025* (2013.01); *B60Y 2300/46* (2013.01); *F16H 61/00* (2013.01); *F16H 61/21* (2013.01); *F16H 61/686* (2013.01); *F16H 2059/465* (2013.01); *F16H 2061/0015* (2013.01); *F16H 2200/006* (2013.01); *F16H 2200/201* (2013.01); *F16H 2200/2023* (2013.01); *F16H 2200/2046* (2013.01); *F16H 2200/2066* (2013.01); *F16D 2500/1085* (2013.01); *F16D 2500/3127* (2013.01); *F16D 2500/5085* (2013.01); *F16H 2059/186* (2013.01); *Y02T 10/76* (2013.01)
USPC .............................................. 701/67; 701/51

(58) Field of Classification Search
USPC ....................................................... 701/51, 67
See application file for complete search history.

(56) References Cited

U.S. PATENT DOCUMENTS

| 6,676,561 | B2 * | 1/2004 | Fritzer et al. ................... 477/70 |
| 7,490,588 | B2 * | 2/2009 | Kimura et al. ................. 477/109 |
| 2009/0312925 | A1 | 12/2009 | Oue et al. |

FOREIGN PATENT DOCUMENTS

| JP | 2005-8083 A | 1/2005 |
| JP | 2010-107010 (A) | 5/2010 |
| KR | 10-0357591 B1 | 10/2002 |

(Continued)

*Primary Examiner* — Derek D Knight
(74) *Attorney, Agent, or Firm* — Morgan, Lewis & Bockius LLP

(57) ABSTRACT

A method for controlling a clutch of an automatic transmission for improvement of fuel efficiency may include determining whether external driving conditions of a vehicle meets coasting conditions, determining a clutch slip control time and an amount of clutch slip torque according to internal driving conditions of the vehicle, performing slip control on a clutch that works at each step of the automatic transmission using the determined clutch slip control time and torque, wherein an engine brake torque transmitted to a final output shaft of the automatic transmission may be reduced.

13 Claims, 4 Drawing Sheets

(51) Int. Cl.
　　　*B60W 10/115* 　　(2012.01)
　　　*B60W 30/18* 　　(2012.01)
　　　*F16H 61/00* 　　(2006.01)
　　　*F16H 61/21* 　　(2006.01)
　　　*F16H 61/686* 　　(2006.01)
　　　*F16H 59/46* 　　(2006.01)
　　　*F16H 59/18* 　　(2006.01)

(56) References Cited

FOREIGN PATENT DOCUMENTS

| | | |
|---|---|---|
| KR | 10-1013870 B1 | 2/2011 |
| WO | WO 2008/130288 (A1) | 10/2008 |

* cited by examiner

| SHIFT STEP | C1(UD) | C2(6C) | C3(4&OD) | C4(35R) | B1 | B2 | F1 |
|---|---|---|---|---|---|---|---|
| 1 | ● | | | | ○ | | ● |
| 2 | ● | | | | | ● | |
| 3 | ● | | | ● | | | |
| 4 | ● | | ● | | | | |
| 5 | | | ● | ● | | | |
| 6 | | ● | ● | | | | |
| 7 | | | ● | | | ● | |
| 8 | | | ● | | ● | | |
| R1 | | | | ● | ● | | |
| N | | | | | ○ | | |
| P | | | | ● (35%) | | ● (35%) | |

FIG. 5

METHOD FOR CONTROLLING CLUTCH OF AUTOMATIC TRANSMISSION FOR IMPROVEMENT OF FUEL EFFICIENCY

CROSS-REFERENCE TO RELATED APPLICATION

The present application claims priority to Korean Patent Application No. 10-2011-0119432 filed Nov. 16, 2011, the entire contents of which is incorporated herein for all purposes by this reference.

BACKGROUND OF THE INVENTION

1. Field of the Invention

The present invention relates to a method for controlling a clutch of an automatic transmission for improvement of fuel efficiency. More particularly, it relates to a method for controlling a clutch of an automatic transmission, which can improve fuel efficiency using a clutch slip logic of the automatic transmission.

2. Description of Related Art

Generally, the most important factor that determines the performance of a vehicle may be its fuel efficiency.

Actually, certified fuel efficiency and sensory fuel efficiency shows a significant difference according to the driving habit and driving conditions (road surface and other conditions such as weather). Thus, various methods for meeting the actual fuel efficiency of a vehicle are being used. As an example, there is a fuel-cut control method.

The fuel-cut control method refers to a method in which unnecessary fuel consumption is prevented by interrupting fuel injection to an engine when a driver tries to coast a vehicle by taking his/her foot off the accelerator.

Thus, a vehicle can be decelerated by fuel-cut control without stepping on the brake when a driver early takes his/her foot off the accelerator.

However, when a driver takes his/her foot off the accelerator to use fuel-cut control, engine brake simultaneously starts. Accordingly, the speed of a vehicle may be decelerated faster than a driver desires, and a driver cannot help but step on the accelerator. This leads to a slight improvement of fuel efficiency.

For example, when a driver takes his/her foot off the accelerator about 1 km head of his/her destination to coast a vehicle using fuel-cut, the vehicle may be gradually decelerated toward the destination. In this case, since the vehicle may be too fast decelerated due to engine brake before reaching the destination, the driver cannot help but step on the accelerator to accelerate the vehicle to a desired speed or more. Accordingly, the improvement of fuel efficiency may be slight.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for controlling a clutch of an automatic transmission for improvement of fuel efficiency, which uses a clutch slip logic of the automatic transmission instead of a typical fuel-cut logic to minimize engine brake and achieve coasting of a vehicle.

In an aspect of the present invention, a method for controlling a clutch of an automatic transmission for improvement of fuel efficiency, may include determining whether external driving conditions of a vehicle meets coasting conditions, determining a clutch slip control time and an amount of clutch slip torque according to internal driving conditions of the vehicle, performing slip control on a clutch that works at each step of the automatic transmission using the determined clutch slip control time and torque, wherein an engine brake torque transmitted to a final output shaft of the automatic transmission is reduced.

The determining of whether the external driving conditions of the vehicle meets the coasting conditions is performed after an accelerator and a brake are off-state.

The internal driving conditions of the vehicle may include an engine speed, a turbine speed of a torque converter, a deceleration of the vehicle, and a driving resistance torque.

The determining of the clutch slip control time and the amount of the clutch slip torque may include determining a difference between the engine speed and the turbine speed of the torque converter of the automatic transmission, and determining the driving resistance torque of the vehicle.

The determining of whether the external driving conditions, which determines whether the vehicle is running on a coastable road, may include determining that the coasting conditions are satisfied when a driving inclination angle of the vehicle is within a predetermined angle.

The coasting conditions are satisfied when the driving inclination angle of the vehicle corresponds to an angle of a flat road or an downhill road.

The driving inclination angle of the vehicle is measured by a G sensor.

The performing of the slip control may include reducing a clutch actuating oil pressure applied to the clutch that works at the each step of the automatic transmission based on the determined clutch slip control time and torque.

The method may further include determining an engine torque increment and a reapplied amount of clutch actuating oil pressure according to a vehicle speed upon reacceleration and then normally applying an actuating oil pressure to the clutch when an accelerator is determined to be on-state during the clutch slip control.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a table illustrating the each-step operation of a clutch of an automatic transmission with eight forward steps and one backward step to which clutch slip control can be applied according to an exemplary embodiment of the present invention.

Figure 1:
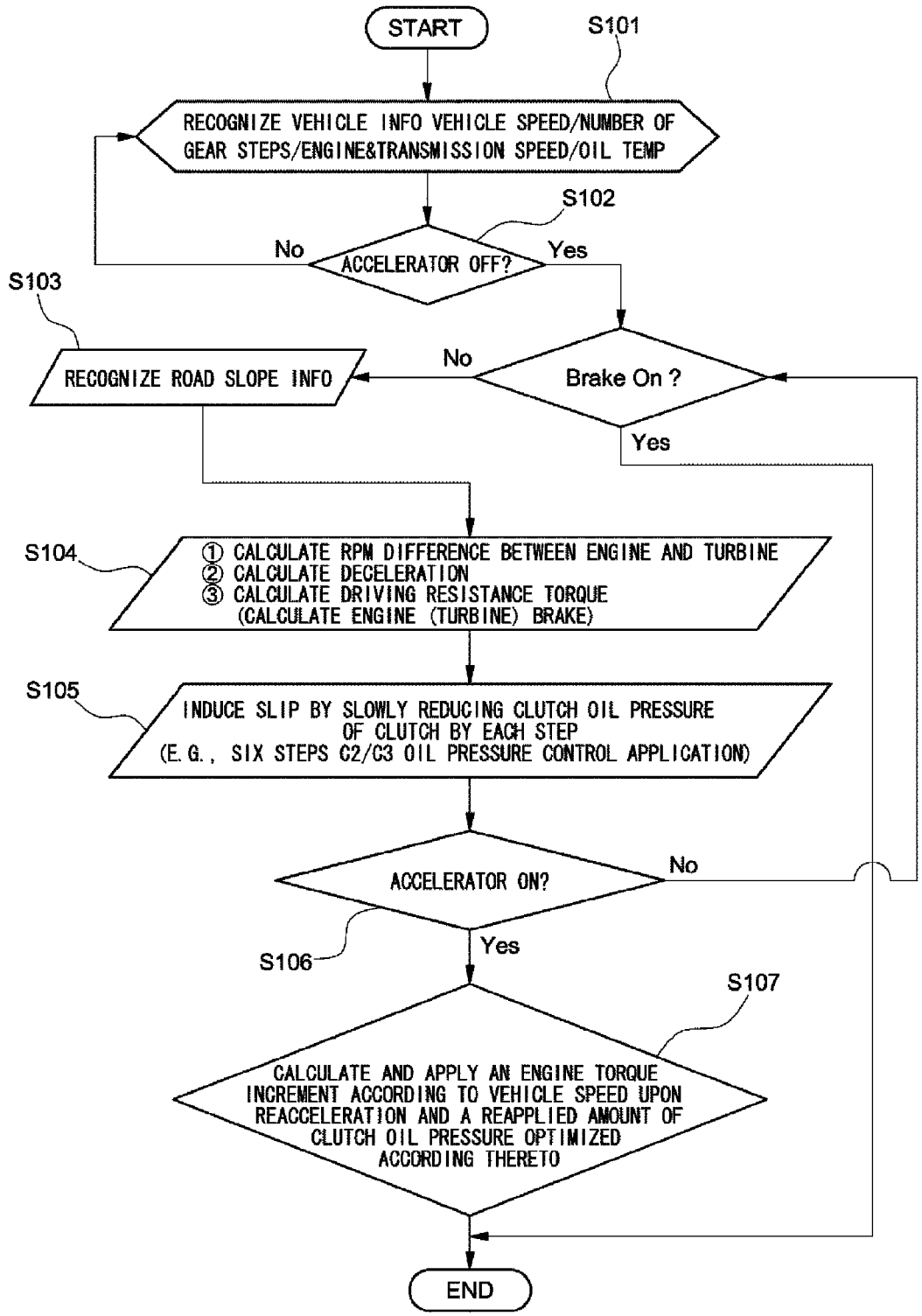
FIG. 1 is a flowchart illustrating a method for controlling a clutch of an automatic transmission for improvement of fuel efficiency according to an exemplary embodiment of the present invention.

Reference numerals set forth in the Drawings includes reference to the following elements as further discussed below:

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Unlike a typical fuel efficiency driving manner in which fuel-cut is emphasized to improve fuel efficiency, the present invention improves fuel efficiency by applying a clutch slip logic of an automatic transmission.

For example, when a driver takes his/her foot off the accelerator about 1 km ahead of his/her destination to coast a vehicle, the vehicle may be gradually decelerated toward the destination. In this case, a vehicle may be allowed to reach a destination without being rapidly decelerated to a desired level (a level at which a driver need not step on the accelerator) or less, by minimizing an engine brake torque transmitted to an output shaft through slip control on a clutch in an automatic transmission instead of a typical fuel-cut control method.

For better understanding of the present invention, the structure and flow of power transmission of an automatic transmission with eight forward steps and one backward step to which a clutch slip logic can be applied according to an exemplary embodiment of the present invention will be described in brief.

Figure 3:
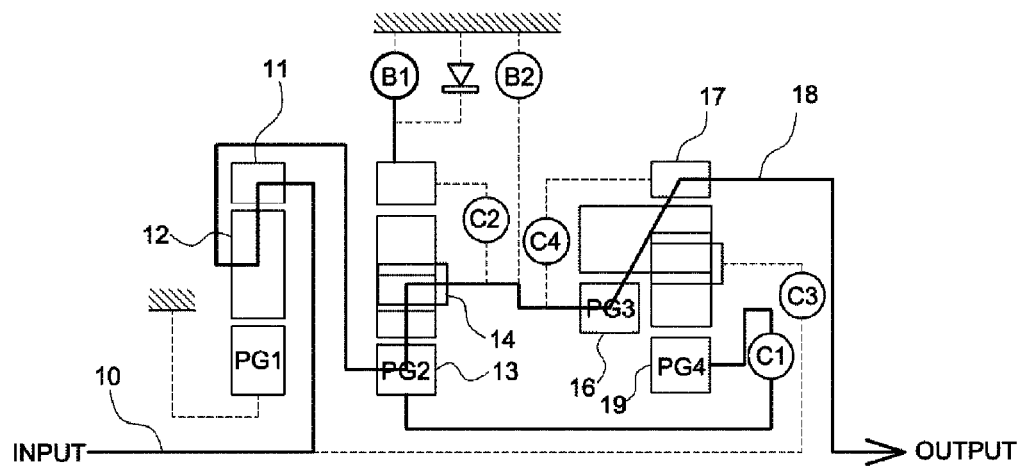
FIGS. 3 and 4 are views illustrating power transmission of an automatic transmission with eight forward steps and one backward step to which clutch slip control can be applied according to an exemplary embodiment of the present invention.
Figure 4:
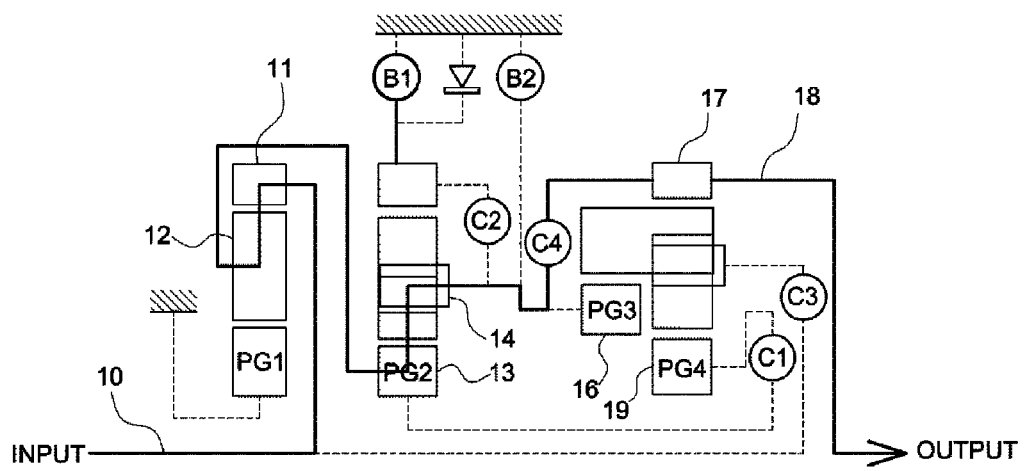

FIGS. 3 and 4 are views illustrating power transmission of an automatic transmission with eight forward steps and one backward step to which clutch slip control can be applied according to an exemplary embodiment of the present invention. FIG. 3 illustrates a forward power transmission flow of a step D1, and FIG. 4 illustrates a backward power transmission flow of a step R.

In the forward power transmission flow of the step D1, as shown in FIG. 3, the engine power may be input to an input shaft 10 via a torque converter, and then may be sequentially transmitted in the order of a front annulus gear 11 of a front planetary gear set, front carrier 12, a mid sun gear 13 of a mid planetary gear set, a mid carrier 14, a rear sun gear (single) 16 of a rear planetary gear set, a rear annulus gear 17, and an output shaft 18. As an internal loop, the power may be transmitted through the mid sun gear 13 of the mid planetary gear set, an under-drive (UD) drum, an under-drive (UD) hub, and the rear sun gear (double) 19 of the rear planetary gear set.

In this case, a first brake B1 and a first clutch C1 may operate.

In the backward power transmission flow of the step R, as shown in FIG. 4, the engine power may be input to the input shaft 10, and then may be sequentially transmitted in the order of the front annulus gear 11 of the front planetary gear set, the front carrier 12, the mid sun gear 13 of the mid planetary gear set, the mid carrier 14, the rear annulus gear 17 of the rear planetary gear set, and the output shaft 18.

In this case, the brake B1 and a fourth clutch C4 may operate.

When a slip control logic according to an exemplary embodiment of the present invention is applied to a plurality of clutches C1, C2, C3, and C4 included in an automatic transmission with eight forward steps, and a driver intends to coast a vehicle to a destination by taking his/her foot off the accelerator, the speed of coasting may not be rapidly reduced due to engine brake, but may be slowly reduced to a desired speed (to a speed at which a driver does not step on the accelerator), thereby coasting the vehicle to the destination.

Hereinafter, a clutch slip logic of an automatic transmission according to an exemplary embodiment of the present invention will be described with reference to FIG. 1.

First, ECU and TCU that perform logic may normally recognize vehicle information (S101). It is determined whether the accelerator is on or off (S102), and then it is determined whether the brake is not stepped on.

The ECU may recognize the vehicle speed and the engine speed (rpm), and the transmission control unit (TCU) may recognize the gear step and the transmission speed and temperature. When a driver takes the foot off the accelerator to allow the accelerator to be off and simultaneously the brake is not stepped on, the preparation stage for entrance into the clutch slip logic may progress.

The preparation stage into the clutch slip logic is determining whether coasting (driven by inertia without engine power) conditions are satisfied. The preparation stage may be divided into determining the coasting conditions according to external driving conditions of a vehicle and determining the clutch slip control time and the amount of clutch slip torque according to internal driving conditions of a vehicle.

The determining of the coasting conditions may include determining whether a vehicle runs on a coastable road, and may be based on a driving inclination angle (slope information) of a vehicle which is measured by a G sensor of the vehicle (S103).

The driving inclination angle measured by the G sensor of a vehicle may be received from TCU to determine whether coasting is possible. For example, when the driving inclination angle ranges from about 0 degree to about 5 degrees corresponding to a flat road, or is about 0 degree or less corresponding to a downhill road, it may be determined that the coasting condition is satisfied.

When the coasting condition is satisfied, the clutch slip control time and the amount of the clutch slip torque may be determined according to the internal driving conditions of a vehicle. The internal driving conditions of a vehicle may include engine speed, turbine speed of a torque converter, deceleration of a vehicle, and driving resistance torque such as engine brake.

The determining of the clutch slip control time and the amount of the clutch slip torque may include calculating a difference between the engine speed and the turbine speed of the torque converter, calculating the deceleration of a vehicle, and calculating the driving resistance torque (engine (turbine) brake) of a vehicle (S104).

In this case, the calculating of the difference between the engine speed and the turbine speed of the torque converter of the automatic transmission may be for knowing the clutch slip time by recognizing when the engine driving torque due to the difference between the engine speed and the turbine speed of the torque converter is smaller than the driving torque of the turbine of the torque converter, and further knowing the clutching slip time by recognizing when the variation of the engine speed between its increase and decrease is greatest, i.e., the tip-out point.

The calculating of the deceleration of the vehicle may be for performing clutch slip control by knowing a point when a vehicle is decelerated after being accelerated.

The calculating of the driving resistance torque of the vehicle may be for measuring the pure engine resistance torque by the vehicle resistance (air, tire, slope, etc.) torques and determining the clutch slip torque according to the magnitude of the engine resistance torque.

Thus, the most appropriate clutch slip control time may be determined by the calculating of the difference between the engine speed and the turbine speed of the torque converter of the automatic transmission and the calculating of the deceleration of a vehicle, and the amount of the clutch slip torque may be determined by the calculating of the driving resistance torque of a vehicle.

A TCU map that determines the clutching slip control time and the amount of the clutch slip torque may be made by beforehand tuning the number of gear steps of the transmission, slope information, vehicle speed, and difference between the engine speed and the turbine speed of the torque converter when the engine brake torque acts. The clutch slip control may be performed by the TCU map.

Thus, when the coasting conditions are satisfied, and simultaneously the clutch slip control time and the amount of the clutch slip torque are determined, the clutch slip control according to an exemplary embodiment of the present invention may be substantially performed.

The clutch slip control may be performed by calculating a clutch slip torque that can minimize the engine brake torque (reverse torque) applied to the output shaft of the automatic transmission along with accelerator-off.

The clutch slip control according to the exemplary embodiment of the present invention may include performing clutch slip by slowly reducing the clutch-actuating oil pressure that works by each step of the automatic transmission (S105).

More specifically, the clutch slip control may slowly reduce the actuating oil pressure of a clutch that works at the current step of the automatic transmission, but may slowly reduce the actuating oil pressure until a disk and a friction plate constituting the clutch are completely separated from each other according to a clutch slip torque command by the TCU map, inducing slip friction between the disk and the friction plate. Thus, the torque by engine brake, which is transmitted to the final output shaft of the automatic transmission, may be minimized. Also, during coasting of a vehicle, the speed of the vehicle may not be rapidly reduced, but may be reduced at a desired level.

For example, when a driver takes his/her foot off the accelerator about 1 km ahead of his/her destination to coast a vehicle using fuel-cut, the actuating oil pressure of a clutch that works at the current step may be slowly reduced, thereby generating clutch slip. Thus, a torque by engine brake, which is transmitted to the final output shaft, may be minimized, and the vehicle may be induced to slowly decelerate at a desired level (a level at which a driver need not step on the accelerator), thereby achieving improvement of fuel efficiency.

In a typical fuel-cut method, at a time when a vehicle reaches a destination, since the vehicle is rapidly decelerated at a desired level (a level at which a driver need not again step on the accelerator) or less, a driver may again step on the accelerator to exit to the destination, leading to a slight fuel efficiency improvement effect.

In this embodiment, however, since a torque by engine brake, which is transmitted to the final output shaft, is minimized by performing clutch slip control, a vehicle may be induced to slowly decelerate at a desired level (a level at which a driver need not again step on the accelerator). Accordingly, since unnecessary fuel consumption due to the stepping on the accelerator can be prevented, the fuel efficiency can be improved.

Hereinafter, clutch slip control performed in an automatic transmission with six steps will be described in detail with reference to FIGS. 2 and 5.

Figure 2:
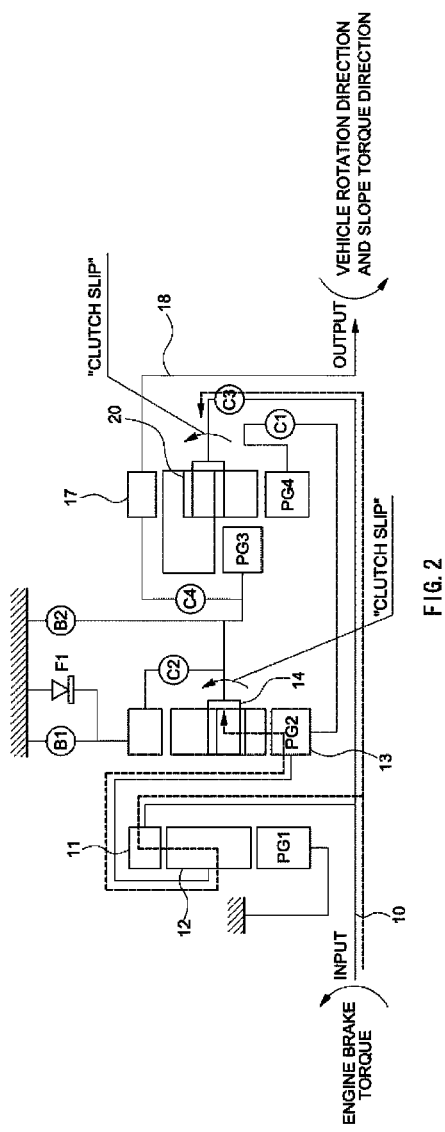
FIG. 2 is a view illustrating an operation for controlling a clutch slip for improvement of fuel efficiency according to an exemplary embodiment of the present invention.

In a transmission flow of six forward power, as shown in FIG. 2, the engine power may be input to an input shaft 10 via a torque converter, and simultaneously may be transmitted to a front annulus gear 11 of a front planetary gear set, a front carrier 12, a mid sun gear 13 of a mid planetary gear set, and a mid carrier 14 as an internal loop. Also, the power input to the input shaft 10 may be sequentially transmitted in the order of a rear carrier 20 of a rear planetary gear set, a rear annulus gear 17, and an output shaft 18.

In this case, a second clutch C2 and a third clutch C3 may operate.

When a driver takes his/her foot off the accelerator during power transmission of six steps, engine brake is actuated. An engine brake torque (reverse torque against the rotation direction of the output shaft) may uniformly act on the power flow path of six steps.

Thus, when the engine brake torque acts, slip control of a second clutch C2 engaged for power transmission of the mid carrier 14 and a third clutch C3 engaged for power transmission of the rear carrier 20 may be performed.

Slip of the second clutch C2 and the third clutch C3 may be performed by slowly reducing an actuating oil pressure supplied for actuation of the second clutch C2 and the third clutch C3 until a disk and a friction plate constituting a clutch are completely separated from each other according to a clutch slip torque command by the TCU map. Thus, due to the slip of the second clutch C2 and the third clutch C3, the engine brake torque directly acting on the output shaft can be reduced.

Since the engine brake torque is reduced by the slip of the second clutch C2 and the third clutch C3 and acts on the output shaft, the engine brake torque acting on the output shaft can be minimized.

Accordingly, since the engine brake torque transmitted to the final output shaft 18 of the automatic transmission is minimized, a vehicle is not rapidly decelerated during coasting, but can be slowly decelerated at a desired level (level at which a driver need not again step on the accelerator) until the vehicle reaches his/her destination, thereby enabling the improvement of fuel efficiency.

During the clutch slip control, if a driver determines that coasting has been sufficiently performed, and steps on the accelerator again to allow the accelerator to be on-state (S106), the engine torque increment according to the vehicle speed during re-acceleration and a reapplied amount of clutch actuating oil pressure optimized according thereto may be calculated, and then an actuating oil pressure may be normally applied to the clutch (S107).

According to embodiments of the present invention, the fuel efficiency can be improved by control of a clutch slip of an automatic transmission, compared to control of a typical fuel-cut used for increase of fuel efficiency during coasting of a vehicle.

Accordingly, since coasting of a vehicle in which the speed of the vehicle is slowly decelerated at a desired level (a level at which a driver need not step on the accelerator) can be achieved by minimizing an engine brake torque using a clutch slip logic of an automatic transmission instead of a typical fuel-cut logic, the fuel efficiency can be improved compared to a typical fuel-cut control method.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a clutch of an automatic transmission for improvement of fuel efficiency, the method comprising:
   determining whether external driving conditions of a vehicle meets coasting conditions;
   determining a clutch slip control time and an amount of clutch slip torque according to internal driving conditions of the vehicle; and
   performing slip control on a clutch that works at a current shift step of the automatic transmission using the determined clutch slip control time and torque,
   wherein an engine brake torque transmitted to a final output shaft of the automatic transmission is reduced, and
   wherein the internal driving conditions of the vehicle include an engine speed, a turbine speed of a torque converter, a deceleration of the vehicle, and a driving resistance torque.

2. The method of claim 1, wherein the determining of whether the external driving conditions of the vehicle meets the coasting conditions is performed after an accelerator and a brake are in an off-state.

3. The method of claim 1, wherein the determining of the clutch slip control time and the amount of the clutch slip torque includes:
   determining a difference between the engine speed and the turbine speed of the torque converter of the automatic transmission; and
   determining the driving resistance torque of the vehicle.

4. The method of claim 1, wherein the performing of the slip control includes reducing a clutch actuating oil pressure applied to the clutch that works at the current shift step of the automatic transmission based on the determined clutch slip control time and torque.

5. The method of claim 1, further including determining an engine torque increment and a reapplied amount of clutch actuating oil pressure according to a vehicle speed upon reacceleration and then normally applying an actuating oil pressure to the clutch when an accelerator is determined to be on-state during the clutch slip control.

6. The method of claim 1, wherein the determining of whether the external driving conditions, which determines whether the vehicle is running on a coastable road, includes determining that the coasting conditions are satisfied when a driving inclination angle of the vehicle is within a predetermined angle.

7. The method of claim 1, wherein the coasting conditions are satisfied when the driving inclination angle of the vehicle corresponds to an angle of a flat road or a downhill road.

8. The method of claim 1, wherein the driving inclination angle of the vehicle is measured by a G sensor.

9. A method for controlling a clutch of an automatic transmission for improvement of fuel efficiency, the method comprising:
   determining whether external driving conditions of a vehicle meets coasting conditions;
   determining a clutch slip control time and an amount of clutch slip torque according to internal driving conditions of the vehicle; and
   performing slip control on a clutch that works at a current shift step of the automatic transmission using the determined clutch slip control time and torque,
   wherein an engine brake torque transmitted to a final output shaft of the automatic transmission is reduced,
   wherein the determining of whether the external driving conditions, which determines whether the vehicle is running on a coastable road, includes determining that the coasting conditions are satisfied when a driving inclination angle of the vehicle is within a predetermined angle, and
   wherein the driving inclination angle of the vehicle is measured by a G sensor.

10. The method of claim 9, wherein the coasting conditions are satisfied when the driving inclination angle of the vehicle corresponds to an angle of a flat road or a downhill road.

11. The method of claim 9, wherein the determining of whether the external driving conditions of the vehicle meets the coasting conditions is performed after an accelerator and a brake are in an off-state.

12. The method of claim 9, wherein the performing of the slip control includes reducing a clutch actuating oil pressure applied to the clutch that works at the current step of the automatic transmission based on the determined clutch slip control time and torque.

13. The method of claim 9, further including determining an engine torque increment and a reapplied amount of clutch actuating oil pressure according to a vehicle speed upon reacceleration and then normally applying an actuating oil pressure to the clutch when an accelerator is determined to be on-state during the clutch slip control.

* * * * *